UNITED STATES PATENT OFFICE.

GEORGE S. COLBURN, OF GARDNER, MASSACHUSETTS.

BOOT AND SHOE BLACKING.

SPECIFICATION forming part of Letters Patent No. 325,320, dated September 1, 1885.

Application filed March 16, 1885. (No specimens.)

*To all whom it may concern:*

Be it known that I, GEORGE S. COLBURN, of Gardner, in the county of Worcester and State of Massachusetts, a citizen of the United States, have invented a new and useful Improvement in Boot and Shoe Blacking, of which the following is a full, clear, and exact description.

The object of the invention is to provide a composition for blacking the uppers and sole-edges of boots and shoes, and other leather articles, which, while it has upon application a high polish, shall act as a leather-preservative.

The ingredients which I use in the composition are gum-shellac, alcohol, lamp-black, and neat's-foot oil, and the manner in which they are combined and their proportions are substantially as follows: I take one part neat's-foot oil and four parts alcohol, mix them together, and add a sufficient quantity of lamp-black to well color the same, and mix it thoroughly with the oil and alcohol. I then add this mixture to fifteen parts of gum-shellac, and intimately combine the same by stirring.

The result of this mixture is a liquid composition. It is put up for the market in bottles. It is applied to the boot or shoe or article to be polished by a sponge, and when applied it dries quickly and takes on a bright polish without rubbing or brushing, and renders the leather at the same time soft and pliable.

Of course I do not limit myself to the especial manner of mixing the ingredients herein specified, or to the exact proportions which I have indicated, as the method of incorporating the various ingredients with the shellac may be somewhat varied and the proportions of the various ingredients changed to a limited extent without materially changing the character of the product.

I am aware of the patent to Charles H. Broad, assignor, for improvement in water-proof blacking, No. 204,528, dated June 4, 1878, which describes a water-proof polish-blacking for leather composed of gum arabic, castor or neat's-foot oil, shellac, ammonia, lamp-black, and solutions of india-rubber and resin, together with an aqueous solution of borax, compounded in suitable proportions; but as my composition does not contain aqueous solution of borax, solutions of india-rubber and resin, and many of the other ingredients named, I consider that the said patent does not describe a composition containing the essential features of my invention.

Having thus fully described my invention, I claim and desire to secure by Letters Patent of the United States—

A blacking composition for boots, shoes, and other articles of leather, comprising one part neat's-foot oil, four parts alcohol, lamp-black to color the same, and fifteen parts of gum-shellac, mixed together substantially as specified, all substantially as and for the purposes described.

GEO. S. COLBURN.

Witnesses:
J. WALTER DAVIS,
GEO. H. DAVIS.